US011055161B2

(12) United States Patent
Venkataswamy et al.

(10) Patent No.: US 11,055,161 B2
(45) Date of Patent: Jul. 6, 2021

(54) SYSTEM AND METHOD FOR AUTOMATIC GENERATION OF A DIAGNOSTIC MODEL (71) Applicant: HONEYWELL INTERNATIONAL INC., Morris Plains, NJ (US)

(72) Inventors: Sadguni Venkataswamy, Karnataka (IN); Kiran Kumar H Halappa, Karnataka (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 169 days.

(21) Appl. No.: 15/955,933

(22) Filed: Apr. 18, 2018

(65) Prior Publication Data
US 2019/0324837 A1 Oct. 24, 2019

(51) Int. Cl.
*B64F 5/60* (2017.01)
*G06F 11/07* (2006.01)
(Continued)

(52) U.S. Cl.
CPC ............ *G06F 11/0739* (2013.01); *B64F 5/40* (2017.01); *B64F 5/60* (2017.01); *G06F 11/079* (2013.01); *B64D 2045/0085* (2013.01)

(58) Field of Classification Search
USPC ....................................... 701/31.8
See application file for complete search history.

(56) References Cited

U.S. PATENT DOCUMENTS 8,307,342 B2  11/2012 Oglesby et al.
8,798,817 B2   8/2014 O'Dell et al.
(Continued)

FOREIGN PATENT DOCUMENTS

CN  105929813 A   9/2016
WO  2017118559 A1  7/2017

OTHER PUBLICATIONS

Cottrell, M., et al.; Fault prediction in aircraft engines using Self-Organizing Maps; 1-SAMOS-MATISSE, UMR CNRS CES, Université Paris 1 Panthéon Sorbonne, France, 2-Machine Learning Group, Université catholique de Louvain, Belgium, 3-SNECMA YYE, Villaroche, France.

(Continued)

*Primary Examiner* — James M McPherson
(74) *Attorney, Agent, or Firm* — Bookoff McAndrews, PLLC (57) ABSTRACT A cloud-based computing system for providing a maintenance message associated with a unique maintenance action for fault rectification is disclosed. The system includes a diagnostic module including one or more processors configured by instructions stored in non-transient computer readable media. The diagnostic module is configured to: identify, for each potential CAS message in an aircraft, a set of inputs that are evaluated to trigger the potential CAS message; identify, for each of the potential CAS messages, each unique combination of input conditions for the set of inputs that triggers the potential CAS message; and identify, for each of the potential CAS messages, a unique maintenance message associated with each unique combination of input conditions that triggers the potential CAS message, wherein each unique maintenance message is associated with a unique maintenance action for fault rectification.

20 Claims, 5 Drawing Sheets (51) Int. Cl.
*B64F 5/40* (2017.01)
*B64D 45/00* (2006.01)

(56) References Cited

U.S. PATENT DOCUMENTS

| | | |
|---|---|---|
| 9,321,542 B2 | 4/2016 | Dunsdon |
| 9,547,944 B2 | 1/2017 | Nelson et al. |
| 9,715,658 B2 | 7/2017 | vanderZweep et al. |
| 2013/0197725 A1* | 8/2013 | O'Dell ............... H04L 67/125 |
| | | 701/14 |
| 2015/0039177 A1 | 2/2015 | Chapman et al. |
| 2016/0196698 A1* | 7/2016 | O'Dell ................ G07C 5/008 |
| | | 701/33.4 |
| 2017/0287239 A1* | 10/2017 | Levy .................. G06F 11/321 |
| 2019/0144129 A1* | 5/2019 | Ouellette ............. B64D 43/00 |
| | | 340/963 |

OTHER PUBLICATIONS

Gerdes, M.; Predictive Health Monitoring for Aircraft Systems using Decision Trees; Linköping Studies in Science and Technology Licentiate Thesis No. 1655.

* cited by examiner

SYSTEM AND METHOD FOR AUTOMATIC GENERATION OF A DIAGNOSTIC MODEL

TECHNICAL FIELD

The present invention generally relates to maintenance systems, and more particularly relates to a maintenance system for automatically generating a diagnostic model.

BACKGROUND

An aircraft may be equipped with an engine-indicating and crew-alerting system (EICAS) to provide aircraft crew with aircraft engines and other systems instrumentation and crew annunciations. EICAS may include instrumentation of various engine parameters, including for example revolutions per minute, temperature values, fuel flow and quantity, oil pressure, etc. The crew-alerting system (CAS) portion of EICAS may be used to signal a system failure by showing one or more messages in a small window near other EICAS indications. There may be a number of different system problems that trigger a particular CAS message on an aircraft. Therefore, the CAS message, by itself, may not identify to a maintainer the specific actions to take to resolve the condition resulting in the CAS message. Moreover, the conditions that trigger a particular CAS message may vary from one aircraft to another. Thus, a maintainer, may have to conduct extensive troubleshooting to identify the condition that triggered the CAS message.

Hence, it is desirable to provide systems and methods for enabling a maintainer to identify the conditions that triggered a CAS message and the maintenance actions for fault rectification. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a computer-implemented method in a cloud-based computing system for providing maintenance assistance to aircraft maintenance personnel is disclosed. The method includes receiving, by a processor in the computing system, a crew alerting system (CAS) message that is displayed to aircrew on an aircraft; identifying, by the processor, a set of inputs that may trigger the CAS message; identifying, by the processor, the condition of each input in the set of the inputs; identifying, by the processor based on the condition of each input in the set of the inputs, a maintenance message associated with the CAS message that identifies a unique maintenance action for fault rectification for the CAS message.

In another embodiment, a cloud-based computing system for providing a maintenance message associated with a unique maintenance action for fault rectification for a CAS message is disclosed. The system includes a diagnostic module including one or more processors configured by instructions stored in non-transient computer readable media. The diagnostic module is configured to: identify, for each potential CAS message in an aircraft, a set of inputs that are evaluated to trigger the potential CAS message; identify, for each of the potential CAS messages, each unique combination of input conditions for the set of inputs that triggers the potential CAS message; and identify, for each of the potential CAS messages, a unique maintenance message associated with each unique combination of input conditions that triggers the potential CAS message, wherein each unique maintenance message is associated with a unique maintenance action for fault rectification.

In another embodiment, a cloud-based computing system for providing a maintenance message associated with a unique maintenance action for fault rectification for a CAS message is disclosed. The cloud-based computing system is configured to: generate a diagnostic model for the crew alerting system (CAS) messages in an aircraft, wherein each CAS message is associated with a set of maintenance messages, wherein a unique maintenance message is associated with each unique combination of input conditions that triggers the CAS message, wherein each maintenance message is associated with a unique maintenance action for fault rectification; receive a CAS message that is displayed to aircrew on the aircraft; identify, using the diagnostic model, a set of inputs that may trigger the CAS message; identify the condition of each input in the set of the inputs; identify, based on the condition of each input in the set of the inputs, a maintenance message associated with the CAS message; receive a query from a user device regarding the status of aircraft health or the CAS message; and respond to the query by providing the CAS message and the maintenance message, wherein the maintenance message is associated with a unique maintenance action for fault rectification for the CAS message.

Furthermore, other desirable features and characteristics will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, database systems, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
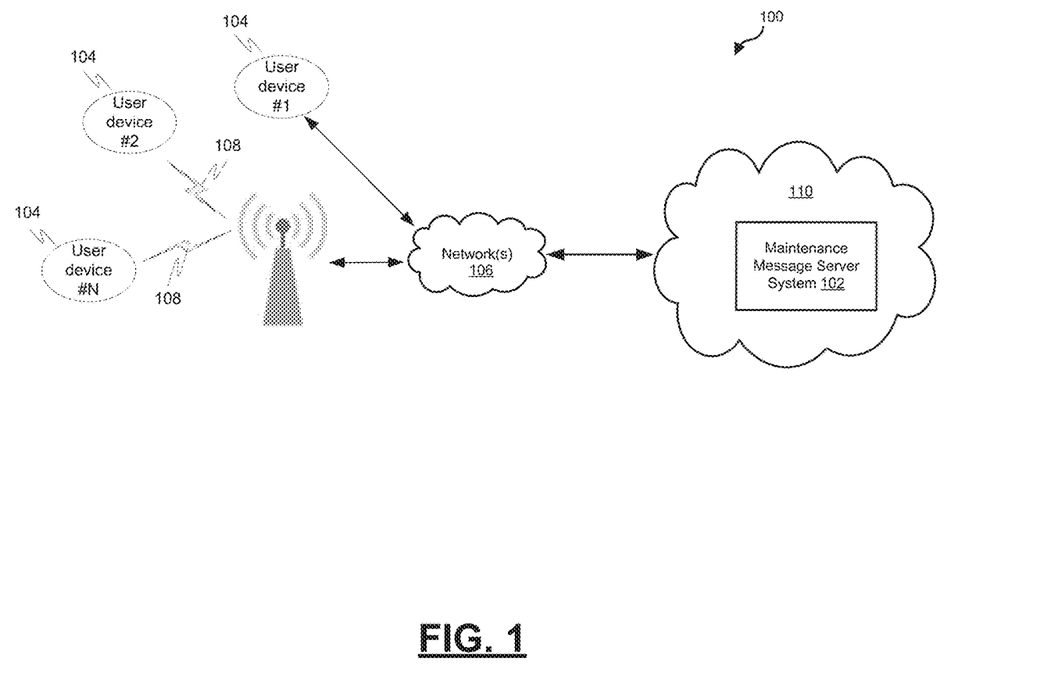
FIG. 1 is a block diagram depicting an example environment in which an example maintenance message server system may be deployed, in accordance with some embodiments.

FIG. 1 is a block diagram depicting an example environment 100 in which an example maintenance message server system 102 may be deployed. In the example environment 100, one or more maintenance personnel (e.g., maintainers) using user devices 104, such as smart phones, tablets, laptops, etc., may, via a network 106, access a maintenance message server system 102 to retrieve information to assist in resolving maintenance matters on an aircraft. The example maintenance message server system 102 is configured to generate a unique maintenance message, in response to a crew-alerting system (CAS) message displayed to flight crew in an aircraft flight deck, that identifies a unique maintenance action for a maintainer to undertake for fault rectification on the aircraft.

An aircraft may be equipped with an engine-indicating and crew-alerting system (EICAS) to provide aircraft crew with aircraft engines and other systems instrumentation and crew annunciations. EICAS may include instrumentation of various engine parameters, including for example revolutions per minute, temperature values, fuel flow and quantity, oil pressure, etc. The CAS portion of EICAS may be used to signal a system failure by showing one or more messages in a small window near other EICAS indications. There may be a number of different system problems that trigger a particular CAS message on an aircraft. Therefore, the CAS message, by itself, may not identify to a maintainer the specific actions to take to resolve the condition resulting in the CAS message. Moreover, the conditions that trigger a particular CAS message may vary from one aircraft to another. Thus, a maintainer, without the maintenance message server system 102 may have to conduct extensive troubleshooting to identify the condition that triggered the CAS message. The maintenance message server system 102, however, is configured to identify the conditions that triggered the CAS message and generate a unique maintenance message that identifies a unique maintenance action for a maintainer to undertake for fault rectification.

A user device 104 supported by the operating environment 100 may be implemented using any suitable hardware platform. In this regard, the user device 104 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 104 supported by the operating environment 100 is realized as a computer-implemented or computer-based device having the hardware, software, firmware, and/or processing logic needed to carry out the various techniques and methodologies described herein.

For example, the user device 104 includes a microprocessor in the form of a programmable device that includes one or more instructions stored in an internal memory structure and applied to receive binary input to create binary output. In some embodiments, the user device 104 includes cellular communications functionality such that the device carries out voice and/or data communications 108 over a communication network using one or more cellular communications protocols. In various embodiments, the user device 104 includes a visual display, such as a touch-screen graphical display, or other display.

The user devices 104 may communicate with the example maintenance message server system 102, for example, via a cellular communication channel 108 over a cellular network such as 4G LTE or 4G LTE-V2X, a public network 106, and/or a private network 110. Communication between a user device 102 and the example maintenance message server system 102 may be App-based (e.g., using an application program executing on the user device), browser based, or both.

Figure 2:
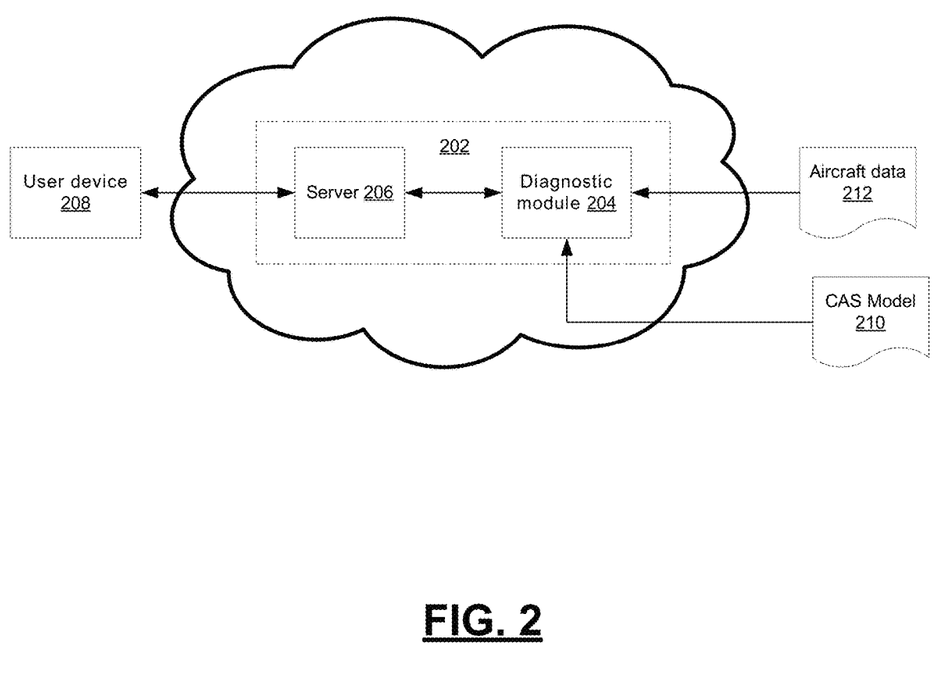
FIG. 2 is a block diagram depicting an example maintenance message server system, in accordance with some embodiments.

FIG. 2 is a block diagram depicting an example maintenance message server system 202. The example maintenance message server system 202 comprises a diagnostic module 204 and a server 206 that communicates with a user device 208. The example maintenance message server system 202 comprises one or more processors configured by programming instructions encoded on non-transient computer readable media to implement the diagnostic module 204 and the server 206.

The processor may be any custom-made or commercially available processor, a central processing unit (CPU), a graphics processing unit (GPU), an application specific integrated circuit (ASIC), a field programmable gate array (FPGA), an auxiliary processor among several processors associated with the maintenance message server system 202, a semiconductor-based microprocessor (in the form of a microchip or chip set), any combination thereof, or generally any device for executing instructions. The computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of many known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the maintenance message server system 202. The processors and memory of the example system 202 are configured by the executable programming instructions to provide the diagnostic module 204 and a server 206. The instructions may include one or more separate programs, each of which comprises an ordered listing of executable instructions for implementing logical functions.

The diagnostic module 204 is configured to generate an aircraft-specific diagnostic model that can be used to identify, for each potential CAS message in a particular aircraft, a set of inputs that are evaluated to trigger the potential CAS message. The diagnostic module 204 is further configured, using the aircraft-specific diagnostic model, to identify, for each of the potential CAS messages, each unique combination of input conditions for the set of inputs that triggers the potential CAS message; and identify, for each of the potential CAS messages, a unique maintenance message associated with each unique combination of input conditions that triggers the potential CAS message, wherein each unique maintenance message is associated with a unique maintenance action for fault rectification.

The aircraft-specific diagnostic model may identify, for each of the potential CAS messages, the logic applied to the set of inputs to trigger the CAS message to identify the unique combination of input conditions that triggers the CAS message. The aircraft-specific diagnostic model may have been generated using machine learning techniques to learn and identify, for each of the potential CAS messages, the unique combination of input conditions that triggers the CAS message. The diagnostic module 204 may include a plurality of aircraft-specific diagnostic models that allow the diagnostic module 204 to provide unique maintenance actions for fault rectification for multiple types of aircraft. The aircraft-specific diagnostic models may be generated internally using CAS logic 210 input to the diagnostic module 204 or externally to the diagnostic module 204 and input to the diagnostic module 204. In the case of learned diagnostic models, the aircraft-specific diagnostic models may be generated internally or generated externally and input (e.g., as a CAS model 210) to the diagnostic module 204.

The diagnostic module 204 is further configured to receive a specific CAS message; use the aircraft-specific diagnostic model to identify the set of inputs that are evaluated to trigger the specific CAS message; retrieve aircraft data 212 (e.g., from an aircraft data bus such as an aircraft system communication bus (ASCB)) that includes the set of inputs that are evaluated to trigger the specific CAS message to identify the condition of each input in the set of the inputs; identify, using the aircraft-specific model and the aircraft data, the unique combination of input conditions that triggered the specific CAS message; and identify a unique maintenance message associated with the unique combination of input conditions that triggered the specific CAS message. The unique maintenance message is associated with a unique maintenance action for fault rectification. The diagnostic module 204 may receive the CAS message from the server 206 via a query to the server 206 from a user device or receive the CAS message from an aircraft.

The server 206 is configured to receive a query from a user device regarding the status of aircraft health or a CAS message that is displayed to aircrew on an aircraft and, responsive to the query, to invoke the diagnostic module 204 to identify the set of inputs that are evaluated to trigger the CAS message, retrieve aircraft data 212 to identify the condition of each input in the set of the inputs, identify the unique combination of input conditions that triggered the specific CAS message, and identify a unique maintenance message associated with the unique combination of input conditions that triggered the specific CAS message. The server is further configured to respond to the query by providing, to the user device, the unique maintenance message associated with the CAS message that identifies the unique maintenance action for fault rectification.

Figure 3:
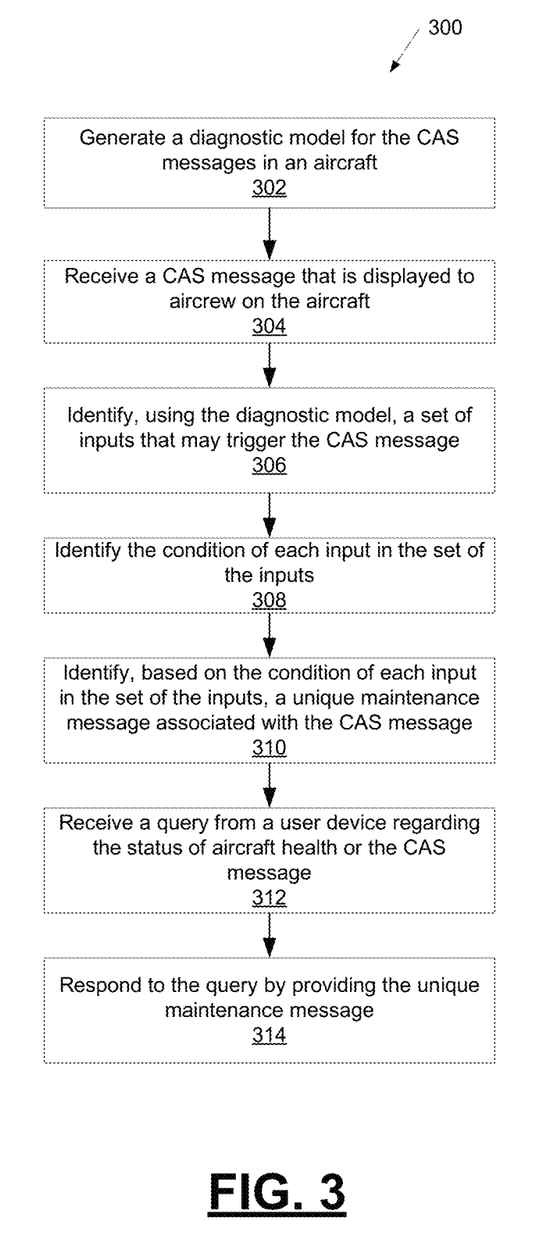
FIG. 3 is a process flow chart depicting an example process in an example maintenance message server system, in accordance with some embodiments.

FIG. 3 is a process flow chart depicting an example process 300 in an example maintenance message server system. The order of operation within the process is not limited to the sequential execution as illustrated in the figure, but may be performed in one or more varying orders as applicable and in accordance with the present disclosure.

The example process 300 includes generating a diagnostic model for the CAS messages in an aircraft (operation 302). The diagnostic model is configured for use to (a) identify, for each potential CAS message in an aircraft, a set of inputs that are evaluated to trigger the potential CAS message; (b) identify, for each of the potential CAS messages, each unique combination of input conditions for the set of inputs that triggers the potential CAS message; and (c) identify, for each of the potential CAS messages, a unique maintenance message associated with each unique combination of input conditions that triggers the potential CAS message, wherein each unique maintenance message is associated with a unique maintenance action for fault rectification. The diagnostic model may be aircraft-specific. The diagnostic model may identify the logic applied to the set of inputs to trigger the CAS messages. The diagnostic model may comprise a machine learning model that was trained using machine learning techniques to identify each unique combination of input conditions that triggers a CAS message. The diagnostic model may be developed internally in the maintenance message server or externally to the maintenance message server system and input to the maintenance message server system. The diagnostic model may be developed internally in the maintenance message server system using CAS logic input to the maintenance message server system. The diagnostic model may also or alternatively be developed internally in the maintenance message server system using machine learning techniques.

The example process 300 includes receiving a CAS message that is displayed to aircrew on the aircraft (operation 304). The CAS message may be received directly from the aircraft. The CAS message may be received from a query from maintenance personnel regarding the status of aircraft health.

The example process 300 includes identifying, using the diagnostic model, a set of inputs that may have triggered the CAS message (operation 306) and identifying the condition of each input in the set of the inputs (operation 308). The condition of each input in the set of the inputs may be identified through receiving aircraft bus data directly from the aircraft. The condition of each input in the set of the inputs may be identified through receiving aircraft bus data via the user device. In this case, after identifying the set of inputs that may have triggered the CAS message, the process may include requesting that the user device retrieve the identified set of inputs.

The example process 300 includes identifying, based on the condition of each input in the set of the inputs, a unique maintenance message associated with the CAS message (operation 310). Identifying the unique maintenance message may include identifying the unique combination of input conditions that triggered the CAS message and identifying the unique maintenance message associated with the unique combination of input conditions that triggered the CAS message.

The example process 300 includes receiving a query from a user device regarding the status of aircraft health or the CAS message (operation 312). The query may be received at almost any point during the process 300 including as the initial operation that initiates the process.

The example process 300 further includes responding to the query by providing the unique maintenance message (operation 314). The unique maintenance message identifies the unique maintenance action for fault rectification for the CAS message.

Figure 4:
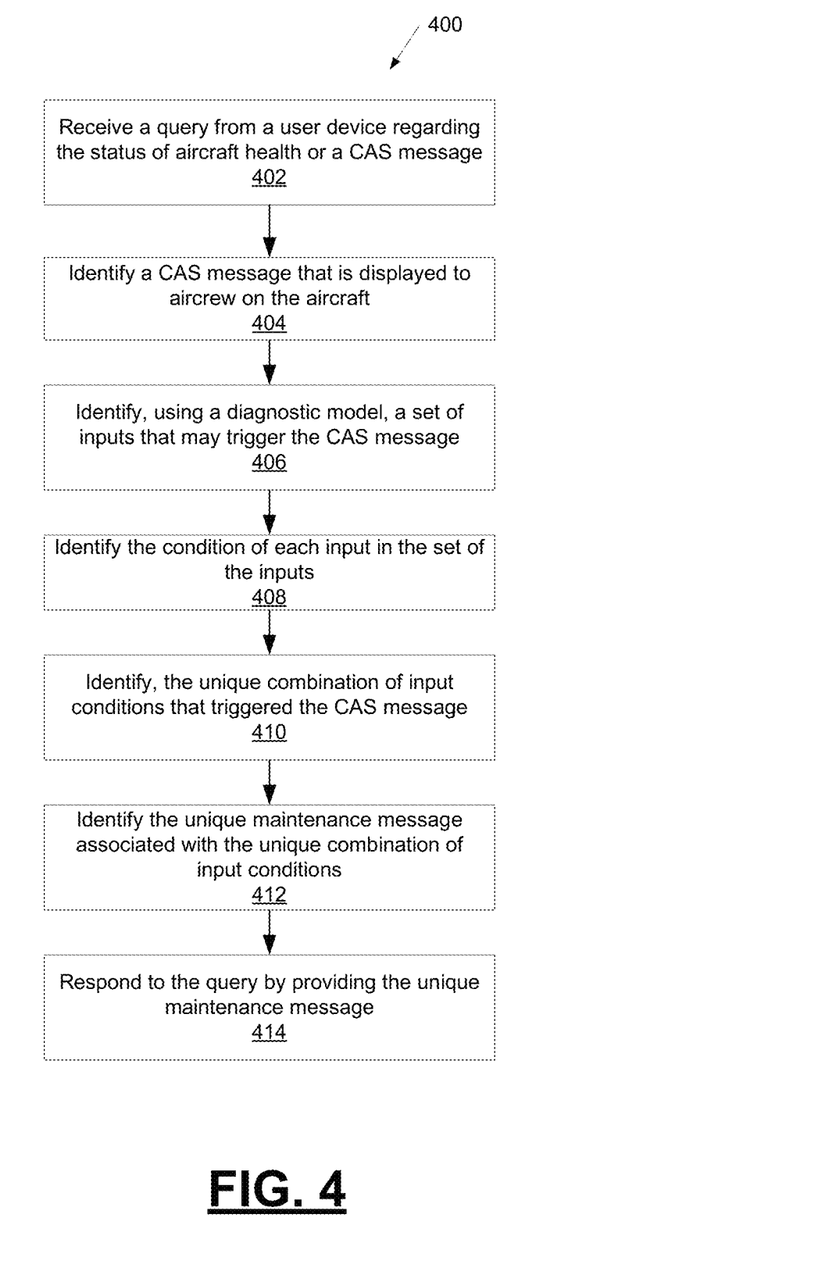
FIG. 4 is a process flow chart depicting another example process in an example maintenance message server system, in accordance with some embodiments.

FIG. 4 is a process flow chart depicting another example process 400 in an example maintenance message server system. The order of operation within the process is not limited to the sequential execution as illustrated in the figure, but may be performed in one or more varying orders as applicable and in accordance with the present disclosure.

The example process 400 includes receiving a query from a user device regarding the status of aircraft health or a CAS message (operation 402) and identifying a CAS message that is displayed to aircrew on the aircraft (operation 404). The CAS message may be received directly from the aircraft. The CAS message may be received from the query from the user device regarding the status of aircraft health or a CAS message.

The example process 400 includes identifying, using a diagnostic model, a set of inputs that may have triggered the CAS message (operation 406). The diagnostic model is configured for use to (a) identify, for each potential CAS message in an aircraft, a set of inputs that are evaluated to trigger the potential CAS message; (b) identify, for each of the potential CAS messages, each unique combination of input conditions for the set of inputs that triggers the potential CAS message; and (c) identify, for each of the potential CAS messages, a unique maintenance message associated with each unique combination of input conditions that triggers the potential CAS message, wherein each unique maintenance message is associated with a unique maintenance action for fault rectification.

The example process 400 includes identifying the condition of each input in the set of the inputs (operation 408). The condition of each input in the set of the inputs may be identified through receiving aircraft bus data directly from the aircraft. The condition of each input in the set of the inputs may be identified through receiving aircraft bus data via the user device. In this case, after identifying the set of inputs that may have triggered the CAS message, the process may include requesting that the user device retrieve the identified set of inputs.

The example process 400 includes identifying the unique combination of input conditions that triggered the CAS message (operation 410) and identifying the unique maintenance message associated with the unique combination of input conditions (operation 412). The example process 400 further includes responding to the query by providing the unique maintenance message (operation 414). The unique maintenance message identifies the unique maintenance action for fault rectification for the CAS message.

Figure 5A:
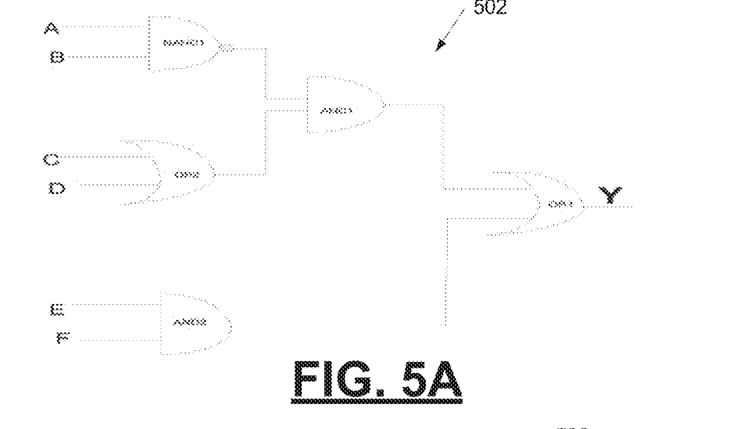
FIG. 5A is a schematic diagram depicting example logic in a diagnostic model for identifying input conditions that may trigger an example CAS message, in accordance with some embodiments.
Figure 5B:
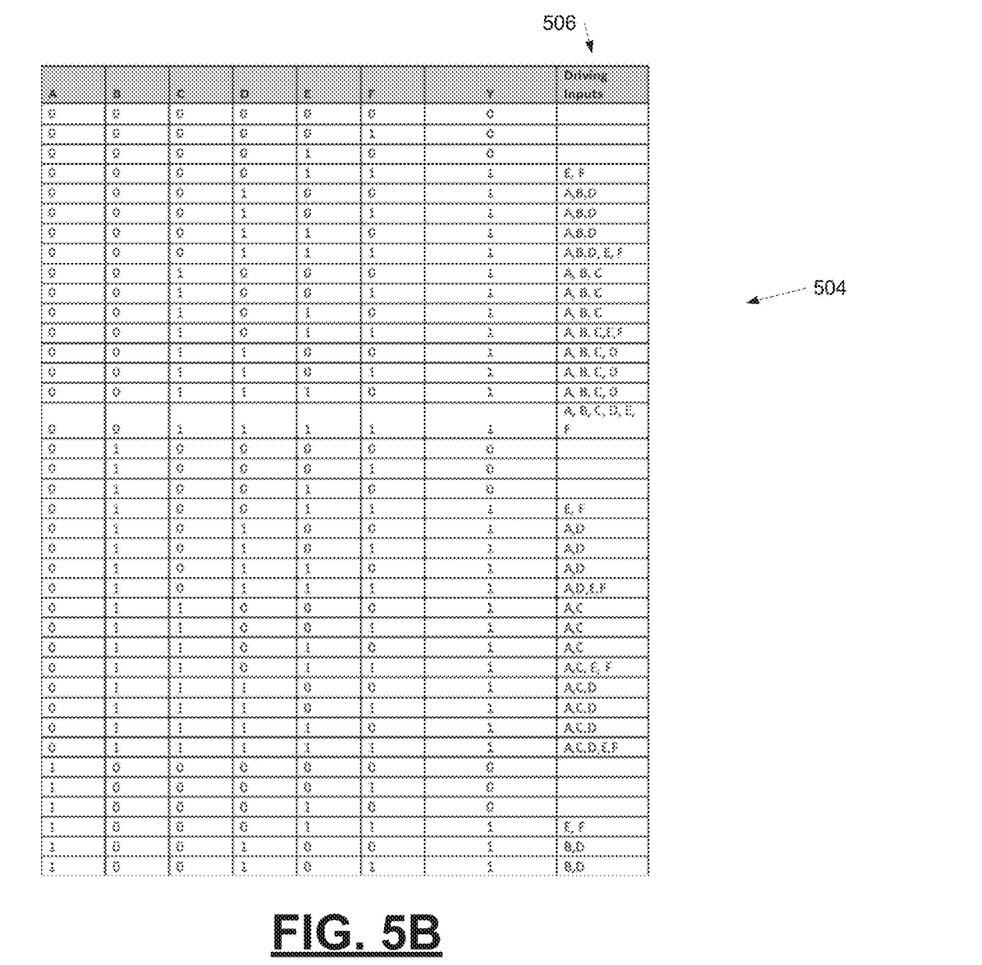
FIG. 5B is a truth table that identifies the set of driving inputs from FIG. 5A that trigger the example CAS message, in accordance with some embodiments.

FIG. 5A is a schematic diagram depicting example logic 502 that may be used to generate a diagnostic model for identifying input conditions that may trigger an example CAS message, and FIG. 5B is a truth table that identifies example sets of driving inputs from FIG. 5A that may trigger the example CAS message. In this example, a diagnostic module (e.g., diagnostic module 204) may generate a diagnostic model using the example logic 502. The example logic 502 can be used to identify each input condition that triggers a CAS message. The diagnostic module can generate, for each CAS message, a truth table 504 based on the example logic 502, wherein A, B, C, D, E, and F correspond to inputs, and Y corresponds to the CAS message to which the truth table 504 pertains. The values for the inputs indicate the condition of the inputs, and the value for Y indicates whether the CAS message has been triggered. In this example, a value of 1 for Y indicates the triggering of the CAS message. The diagnostic module can identify the driving inputs 506 for each unique set of input conditions that triggers the CAS message and assign a unique maintenance message for each unique set of conditions.

In one embodiment, a computer-implemented method in a cloud-based computing system for providing maintenance assistance to aircraft maintenance personnel is disclosed. The method comprises receiving, by a processor in the computing system, a crew alerting system (CAS) message that is displayed to aircrew on an aircraft; identifying, by the processor, a set of inputs that may trigger the CAS message; identifying, by the processor, the condition of each input in the set of the inputs; identifying, by the processor based on the condition of each input in the set of the inputs, a maintenance message associated with the CAS message that identifies a unique maintenance action for fault rectification for the CAS message.

These aspects and other embodiments may include one or more of the following features. Identifying a set of inputs that may trigger the CAS message may comprise invoking a diagnostic module that is configured, for each potential CAS message in the aircraft, to identify the set of inputs that are evaluated to trigger the CAS message and configured to identify, for each of the potential CAS messages, the unique combination of input conditions that triggers the CAS message. The diagnostic module may be configured to identify the logic applied to the set of inputs to set the CAS message to identify the unique combination of input conditions that triggers the CAS message. The diagnostic module may be configured to apply machine learning techniques to identify the unique combination of input conditions that triggers the CAS message. The method may further comprise generating a diagnostic model configured to identify, for each potential CAS message in an aircraft, a set of inputs that are evaluated to trigger the potential CAS message; identify, for each of the potential CAS messages, each unique combination of input conditions for the set of inputs that triggers the potential CAS message; and identify, for each of the potential CAS messages, a unique maintenance message associated with each unique combination of input conditions that triggers the potential CAS message, wherein each unique maintenance message is associated with a unique maintenance action for fault rectification. Identifying a maintenance message may comprise identifying a unique combination of input conditions that triggered the CAS message. Identifying a maintenance message may comprise identifying the unique maintenance message associated with the unique combination of input conditions that triggered the CAS message. Identifying the condition of each input in the set of the inputs may comprise receiving aircraft bus data from the aircraft. Receiving a CAS message may comprise receiving a query from a user device regarding the status of aircraft health. The method may further comprise receiving, by the processor, a query from a user device regarding the status of aircraft health. The method may further comprise responding to the query by providing, by the processor to the user device, the maintenance message associated with the CAS message that identifies the unique maintenance action for fault rectification for the CAS message.

In another embodiment, a cloud-based computing system for providing a maintenance message associated with a unique maintenance action for fault rectification for a CAS message is disclosed. The system comprises a diagnostic module comprising one or more processors configured by instructions stored in non-transient computer readable media. The diagnostic module is configured to: identify, for each potential CAS message in an aircraft, a set of inputs that are evaluated to trigger the potential CAS message; identify, for each of the potential CAS messages, each unique combination of input conditions for the set of inputs that triggers the potential CAS message; and identify, for each of the potential CAS messages, a unique maintenance message associated with each unique combination of input conditions that triggers the potential CAS message, wherein each unique maintenance message is associated with a unique maintenance action for fault rectification.

These aspects and other embodiments may include one or more of the following features. The diagnostic module may be configured to identify, for each of the potential CAS messages, the logic applied to the set of inputs to trigger the CAS message to identify the unique combination of input conditions that triggers the CAS message. The diagnostic module may be configured to apply machine learning techniques to identify the unique combination of input conditions that triggers the CAS message. The computing system may further comprise a server including one or more processors configured by instructions stored in non-transient computer readable media wherein the server is configured to: receive a query from a user device regarding the status of aircraft health or a CAS message that is displayed to aircrew on an aircraft; and invoke the diagnostic module to identify a set of inputs that are evaluated to trigger the CAS message, identify the condition of each input in the set of the inputs, and identify, based on the condition of each input in the set of the inputs, a maintenance message associated with the CAS message that is associated with a unique maintenance action for fault rectification. The server may be configured to invoke the diagnostic module to receive aircraft bus data from the aircraft to identify the condition of each input in the set of the inputs. The diagnostic module may be configured to receive the CAS message via the server receiving a query from a user device. The diagnostic module may be configured to receive the CAS message directly from the aircraft. The server may be further configured to respond to the query by providing, to the user device, the maintenance message associated with the CAS message that identifies the unique maintenance action for fault rectification.

In another embodiment, a computer-implemented method in an aircraft maintenance system for providing a maintenance message is disclosed. The method comprises generating a diagnostic model for the crew alerting system (CAS) messages in an aircraft, wherein each CAS message is associated with a set of maintenance messages, wherein a unique maintenance message is associated with each unique combination of input conditions that triggers the CAS message, wherein each maintenance message is associated with a unique maintenance action for fault rectification; receiving a CAS message that is displayed to aircrew on the aircraft; identifying, using the diagnostic model, a set of inputs that may trigger the CAS message; identifying the condition of each input in the set of the inputs; identifying, based on the condition of each input in the set of the inputs, a maintenance message associated with the CAS message; receiving a query from a user device regarding the status of aircraft health or the CAS message; and responding to the query by providing the CAS message and the maintenance message, wherein the maintenance message is associated with a unique maintenance action for fault rectification for the CAS message.

In another embodiment, a cloud-based computing system for providing a maintenance message associated with a unique maintenance action for fault rectification for a CAS message is disclosed. The cloud-based computing system is configured to: generate a diagnostic model for the crew alerting system (CAS) messages in an aircraft, wherein each CAS message is associated with a set of maintenance messages, wherein a unique maintenance message is associated with each unique combination of input conditions that triggers the CAS message, wherein each maintenance message is associated with a unique maintenance action for fault rectification; receive a CAS message that is displayed to aircrew on the aircraft; identify, using the diagnostic model, a set of inputs that may trigger the CAS message; identify the condition of each input in the set of the inputs; identify, based on the condition of each input in the set of the inputs, a maintenance message associated with the CAS message; receive a query from a user device regarding the status of aircraft health or the CAS message; and respond to the query by providing the CAS message and the maintenance message, wherein the maintenance message is associated with a unique maintenance action for fault rectification for the CAS message.

Those of skill in the art will appreciate that the various illustrative logical blocks, modules, circuits, and algorithm steps described about the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A computing system, the computing system comprising:
    at least one memory storing instructions; and
    at least one processor being configured to execute the instructions to perform operations, the operations including:
        receiving a crew alerting system (CAS) message or a query regarding the CAS message, the CAS message being triggered in relation to an aircraft;
        responsive to receiving the CAS message or the query, selecting an aircraft-specific diagnostic model corresponding to the aircraft, from among a plurality of aircraft-specific diagnostic models;
        identifying, using the selected aircraft-specific diagnostic model, a set of inputs known to trigger the CAS message in relation to the aircraft;
        retrieving aircraft data regarding the aircraft that includes a condition for each input of the set of inputs known to trigger the CAS message;
        identifying, using the selected aircraft-specific diagnostic model and the retrieved aircraft data, a unique combination of input conditions that triggered the CAS message for the aircraft;
        identifying a unique maintenance message associated with the unique combination of input conditions that triggered the CAS message, the unique maintenance message identifying a unique maintenance action that rectifies a fault corresponding to the unique combination of input conditions; and
        transmitting or displaying the unique maintenance message that identifies the unique maintenance action that rectifies the fault.

2. The computing system of claim 1, wherein The computing system of claim 1, wherein identifying the unique maintenance message includes invoking a diagnostic module, the diagnostic module is configured to identify maintenance messages by:
    identifying, for each of a plurality of potential CAS messages in the aircraft, a set of inputs that are evaluated to trigger a specific potential CAS message;
    identifying, for each of the plurality of potential CAS messages, a corresponding set of input conditions for the set of inputs that triggers the specific potential CAS message;
    identifying, for each of the plurality of potential CAS messages, a maintenance message associated with the corresponding set of input conditions for the set of inputs that triggers the specific potential CAS message; and
    identifying, for each of the plurality of potential CAS messages, logic applied to the set of inputs to trigger the specific potential CAS message, the logic being used to identify the unique combination of input conditions that triggered the CAS message.

3. The computing system of claim 1, wherein identifying the unique combination of input conditions that triggered the CAS message includes applying a machine learning model to identify the unique combination of input conditions.

4. The computing system of claim 1, wherein the operations further include generating the plurality of aircraft-specific diagnostic models using machine learning model(s) to learn and identify, for each of a plurality of potential CAS messages, a combination of input conditions that triggered a specific potential CAS message.

5. The computing system of claim 1, wherein retrieving aircraft data includes receiving aircraft bus data from the aircraft as the aircraft data.

6. The computing system of claim 1, wherein the operations further include generating the plurality of aircraft-specific diagnostic models a CAS logic input.

7. The computing system of claim 1, wherein the operations further include generating the plurality of aircraft-specific diagnostic models externally to a diagnostic module and then input to the diagnostic module.

8. The computing system of claim 4, wherein the plurality of aircraft-specific diagnostic models that have been generated using the machine learning model(s) are generated externally to a diagnostic module and input to the diagnostic module.

9. A computer-implemented method comprising:
receiving a crew alerting system (CAS) message or a query regarding the CAS message, the CAS message being triggered in relation to an aircraft;
responsive to receiving the CAS message or the query, selecting an aircraft-specific diagnostic model corresponding to the aircraft, from among a plurality of aircraft-specific diagnostic models;
identifying, using the selected aircraft-specific diagnostic model, a set of inputs known to trigger the CAS message in relation to the aircraft;
retrieving aircraft data regarding the aircraft that includes a condition for each input of the set of inputs known to trigger the CAS message;
identifying, using the selected aircraft-specific diagnostic model and the retrieved aircraft data, a unique combination of input conditions that triggered the CAS message for the aircraft;
identifying a unique maintenance message associated with the unique combination of input conditions that triggered the CAS message, the unique maintenance message identifying a unique maintenance action that rectifies a fault corresponding to the unique combination of input conditions; and
transmitting or displaying the unique maintenance message that identifies the unique maintenance action that rectifies the fault.

10. The computer-implemented method of claim 9, wherein identifying the unique maintenance message includes invoking a diagnostic module, the diagnostic module is configured to identify maintenance messages by:
identifying, for each of a plurality of potential CAS messages in the aircraft, a set of inputs that are evaluated to trigger a specific potential CAS message;
identifying, for each of the plurality of potential CAS messages, a corresponding set of input conditions for the set of inputs that triggers the specific potential CAS message;
identifying, for each of the plurality of potential CAS messages, a maintenance message associated with the corresponding set of input conditions for the set of inputs that triggers the specific potential CAS message; and
identifying, for each of the plurality of potential CAS messages, logic applied to the set of inputs to trigger the specific potential CAS message, the logic being used to identify the unique combination of input conditions that triggered the CAS message.

11. The computer-implemented method of claim 9, wherein identifying the unique combination of input conditions that triggered the CAS message includes applying a machine learning model to identify the unique combination of input conditions.

12. The computer-implemented method of claim 9, further comprising generating the plurality of aircraft-specific diagnostic models using machine learning model(s) to learn and identify, for each of a plurality of potential CAS messages, a combination of input conditions that triggered a specific potential CAS message.

13. The computer-implemented method of claim 9, wherein retrieving aircraft data includes receiving aircraft bus data from the aircraft as the aircraft data.

14. The computer-implemented method of claim 9, further comprising generating the plurality of aircraft-specific diagnostic models a CAS logic input.

15. The computer-implemented method of claim 9, further comprising generating the plurality of aircraft-specific diagnostic models externally to a diagnostic module and then input to the diagnostic module.

16. The computer-implemented method of claim 12, wherein the plurality of aircraft-specific diagnostic models that have been generated using the machine learning model(s) are generated externally to a diagnostic module and input to the diagnostic module.

17. A non-transitory computer-readable medium storing instructions that, when executed by a processor, cause the processor to perform a method, the method comprising:
receiving a crew alerting system (CAS) message or a query regarding the CAS message, the CAS message being triggered in relation to an aircraft;
responsive to receiving the CAS message or the query, selecting an aircraft- specific diagnostic model corresponding to the aircraft, from among a plurality of aircraft-specific diagnostic models;
identifying, using the selected aircraft-specific diagnostic model, a set of inputs known to trigger the CAS message in relation to the aircraft;
retrieving aircraft data regarding the aircraft that includes a condition for each input of the set of inputs known to trigger the CAS message;
identifying, using the selected aircraft-specific diagnostic model and the retrieved aircraft data, a unique combination of input conditions that triggered the CAS message for the aircraft;
identifying a unique maintenance message associated with the unique combination of input conditions that triggered the CAS message, the unique maintenance message identifying a unique maintenance action that rectifies a fault corresponding to the unique combination of input conditions; and
transmitting or displaying the unique maintenance message that identifies the unique maintenance action that rectifies the fault.

18. The non-transitory computer-readable medium of claim 17, wherein identifying the unique maintenance message includes invoking a diagnostic module, the diagnostic module is configured to identify maintenance messages by:
identifying, for each of a plurality of potential CAS messages in the aircraft, a set of inputs that are evaluated to trigger a specific potential CAS message;
identifying, for each of the plurality of potential CAS messages, a corresponding set of input conditions for the set of inputs that triggers the specific potential CAS message;
identifying, for each of the plurality of potential CAS messages, a maintenance message associated with the corresponding set of input conditions for the set of inputs that triggers the specific potential CAS message; and identifying, for each of the plurality of potential CAS messages, logic applied to the set of inputs to trigger the specific potential CAS message, the logic being used to identify the unique combination of input conditions that triggered the CAS message.

19. The non-transitory computer-readable medium of claim 17, wherein identifying the unique combination of input conditions that triggered the CAS message includes applying a machine learning model to identify the unique combination of input conditions.

20. The non-transitory computer-readable medium of claim 17, wherein the method further includes generating the plurality of aircraft-specific diagnostic models using machine learning model(s) to learn and identify, for each of a plurality of potential CAS messages, a combination of input conditions that triggered a specific potential CAS message.

* * * * *